US012786982B2

(12) United States Patent
Yoshioka et al.

(10) Patent No.: US 12,786,982 B2
(45) Date of Patent: Nov. 3, 2026

(54) TERMINAL, BASE STATION, COMMUNICATION SYSTEM, AND METHOD FOR RECEIVING SPS-PDSCH TRANSMISSIONS RELATIVE TO A HARQ PROCESS

(71) Applicant: NTT DOCOMO, INC., Tokyo (JP)

(72) Inventors: Shohei Yoshioka, Tokyo (JP); Daisuke Kurita, Tokyo (JP); Satoshi Nagata, Tokyo (JP); Wenjia Liu, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 366 days.

(21) Appl. No.: 18/580,430

(22) PCT Filed: Aug. 2, 2021

(86) PCT No.: PCT/JP2021/028680
§ 371 (c)(1),
(2) Date: Jan. 18, 2024

(87) PCT Pub. No.: WO2023/012886
PCT Pub. Date: Feb. 9, 2023

(65) Prior Publication Data
US 2025/0008506 A1 Jan. 2, 2025

(51) Int. Cl.
*H04W 4/00* (2018.01)
*H04L 1/1812* (2023.01)
(Continued)

(52) U.S. Cl.
CPC ........... *H04W 72/12* (2013.01); *H04L 1/1812* (2013.01); *H04W 72/232* (2023.01); *H04W 84/06* (2013.01)

(58) Field of Classification Search
CPC ... H04W 72/12; H04W 72/232; H04W 84/06; H04L 1/1812
See application file for complete search history.

(56) References Cited

U.S. PATENT DOCUMENTS

2021/0050953 A1* 2/2021 Park ...................... H04L 1/1819
2022/0271873 A1* 8/2022 Gao ...................... H04L 1/1854
(Continued)

FOREIGN PATENT DOCUMENTS

WO WO-2022053843 A1 * 3/2022 ........... H04L 1/1887

OTHER PUBLICATIONS

International Search Report issued in PCT/JP2021/028680 on Jan. 11, 2022 (3 pages).
(Continued)

*Primary Examiner* — Elisabeth Benoit Magloire
(74) *Attorney, Agent, or Firm* — Osha Bergman Watanabe & Burton LLP

(57) ABSTRACT

A terminal includes: a reception unit configured to receive, from a base station, an indication for activating SPS (Semi-persistent scheduling)-PDSCH (Physical Downlink Shared Channel) in an NTN (Non-Terrestrial Network) environment; a control unit configured to determine whether a HARQ (Hybrid automatic repeat request) feedback corresponding to the SPS-PDSCH is enabled or disabled; and a transmission unit configured to transmit the HARQ feedback to the base station in a case where the HARQ feedback is enabled.

4 Claims, 9 Drawing Sheets

(51) Int. Cl.

| | |
|---|---|
| ***H04W 72/12*** | (2023.01) |
| ***H04W 72/232*** | (2023.01) |
| *H04W 84/06* | (2009.01) |

(56) References Cited

U.S. PATENT DOCUMENTS

| | | | | |
|---|---|---|---|---|
| 2022/0399979 A1* | 12/2022 | Gao | H04L 1/1614 | |
| 2023/0093477 A1* | 3/2023 | El Hamss | H04L 1/1854 | 370/329 |
| 2023/0156735 A1* | 5/2023 | Ying | H04L 1/1614 | 370/329 |
| 2023/0319822 A1* | 10/2023 | Park | H04W 72/11 | 370/329 |

OTHER PUBLICATIONS

Written Opinion of the International Searching Authority issued in PCT/JP2021/028680 on Jan. 11, 2022 (4 pages).
MediaTek Inc.; "HARQ in NR-NTN"; 3GPP TSG RAN WG1 Meeting #105-e, R1-2104566; e-Meeting; May 10-27, 2021 (5 pages).
Sony; "Discussion on delay-tolerant HARQ for NTN"; 3GPP TSG RAN WG1 Meeting #99, R1-1912349; Reno, USA; Nov. 18-22, 2019 (8 pages).
Konishi, et al., "A Study of Downlink Spectrum Sharing in HAPS Mobile Communication Systems", 2020 General Conference of the Institute of Electronics, Information and Communications Technology (IEICE) B-17-1 (3 pages).
Sony; "Enhancements on HARQ for NTN"; 3GPP TSG RAN WG1 Meeting #105-e, R1-2105166; E-meeting; May 10-27, 2021 (9 pages).
3GPP TS 38.214 V16.6.0; "3rd Generation Partnership Project; Technical Specification Group Radio Access Network; NR; Physical layer procedures for data (Release 16)"; Jun. 2021 (172 pages).
3GPP TR 38.821 V16.0.0; "3rd Generation Partnership Project; Technical Specification Group Radio Access Network; Solutions for NR to support non-terrestrial networks (NTN) (Release 16)"; Dec. 2019 (140 pages).
3GPP TS 38.300 V16.6.0; "3rd Generation Partnership Project; Technical Specification Group Radio Access Network; NR; NR and NG-RAN Overall Description; Stage 2 (Release 16)"; Jun. 2021 (152 pages).
Office Action issued in counterpart Japanese Patent Application No. 2023-539410 mailed on Apr. 8, 2025 (6 pages).
Moderator (Huawei); "FL summary#6 on improving reliability for MBS for RRC_CONNECTED UEs"; 3GPP TSG RAN WG1 #105-e, R1-2106330; e-Meeting; May 10-27, 2021 (29 pages).
Office Action issued in counterpart Japanese Patent Application No. 2023-539410 mailed on Aug. 26, 2025 (5 pages).

* cited by examiner

TERMINAL, BASE STATION, COMMUNICATION SYSTEM, AND METHOD FOR RECEIVING SPS-PDSCH TRANSMISSIONS RELATIVE TO A HARQ PROCESS

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

Currently, NTN (Non-Terrestrial Network) is also discussed. The NTN provides services to an area that cannot be covered by a terrestrial 5G network mainly due to the cost aspect, by using a non-terrestrial network such as a satellite (Non-Patent Document 2 and Non-Patent Document 3).

CITATION LIST

Non-Patent Document

Non-Patent Document 1: 3GPP TS 38.300 V16.6.0 (2021 June)

Non-Patent Document 2: 3GPP TR 38.821 V16.0.0 (2019 December)

Non-Patent Document 3: Konishi, et al., "A Study of Downlink Spectrum Sharing in HAPS Mobile Communication System", the Institute of Electronics, Information and Communication Engineers (IEICE) General Conference, B-17-1, 2020

Non-Patent Document 4: 3GPP TS 38.214 V16.6.0 (2021 June)

SUMMARY OF THE INVENTION

Technical Problem

In NTN, because the distance between the base station in the air and the terminal is very large, the propagation delay becomes greater as compared with the terrestrial network, TN. In addition, in a case of LEO (Low Earth orbit) or HAPS (High Altitude Platform Station), there is a situation in which the base station moves. Accordingly, in NTN, supporting an operation of disabling HARQ (Hybrid automatic repeat request) feedback is being discussed.

On the other hand, a condition for disabling the HARQ feedback has not been specified and how to disable or enable the HARQ feedback has not been specified.

The present invention has been made in view of the foregoing and is intended to disable the HARQ (Hybrid automatic repeat request) feedback in the wireless communication system.

Solution to Problem

According to the disclosed technique, a terminal is provided. The terminal includes: a reception unit configured to receive, from a base station, an indication for activating SPS (Semi-persistent scheduling)-PDSCH (Physical Downlink Shared Channel) in an NTN (Non-Terrestrial Network) environment; a control unit configured to determine whether a HARQ (Hybrid automatic repeat request) feedback corresponding to the SPS-PDSCH is enabled or disabled; and a transmission unit configured to transmit the HARQ feedback to the base station in a case where the HARQ feedback is enabled.

Advantageous Effects of Invention

According to the disclosed technique, the HARQ (Hybrid automatic repeat request) feedback can be disabled in the wireless communication system.

DETAILED DESCRIPTION OF THE PREFERRED EMBODIMENTS

Figure 1:
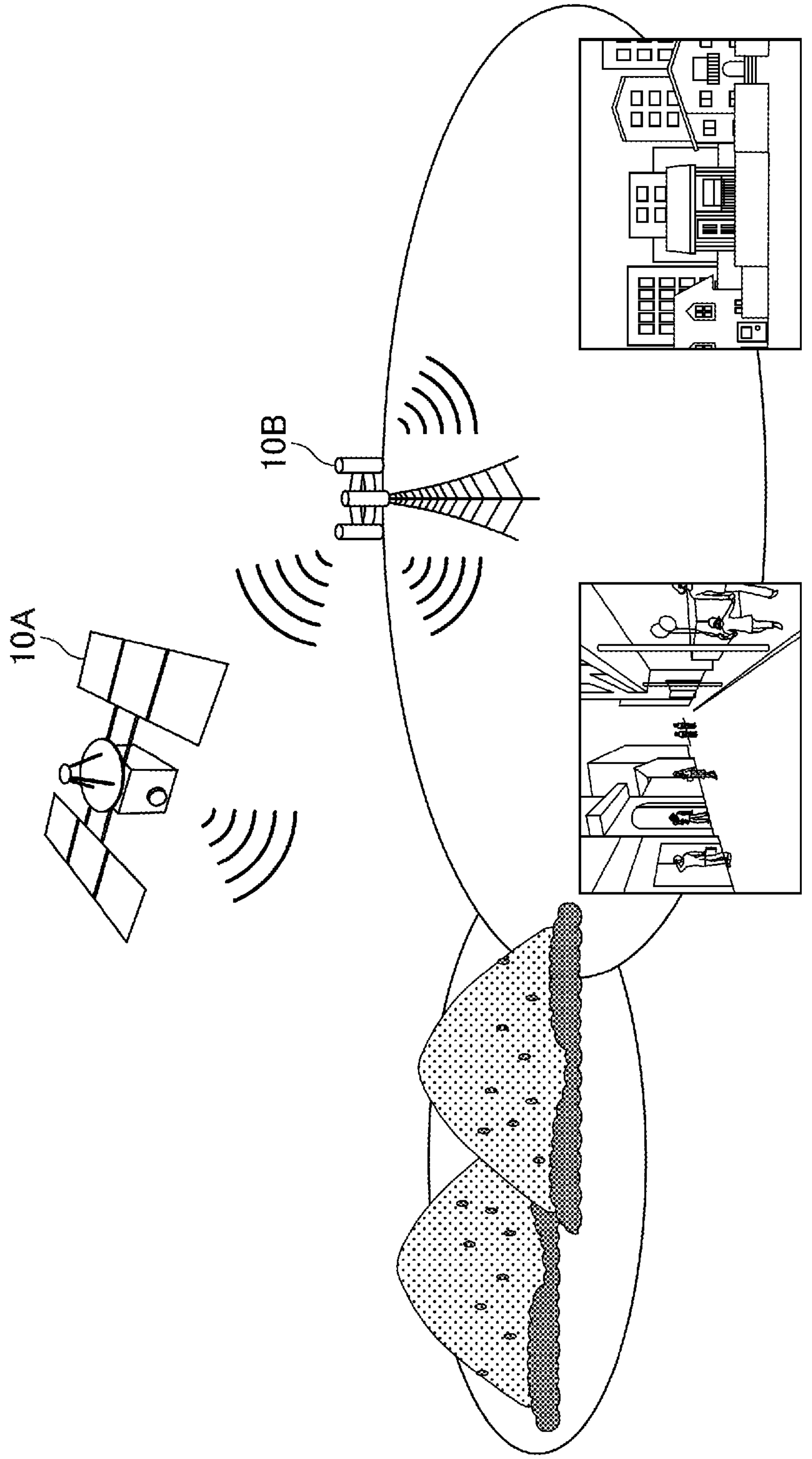
FIG. 1 is a drawing illustrating an example (1) of NTN.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, the above terms in NR correspond to NR-SS, NR-PSS, NR-SSS, NR-PBCH, NR-PRACH, NR-PDCCH, NR-PDSCH, NR-PUCCH, NR-PUSCH, and the like. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating an example (1) of NTN. The NTN provides services to an area that cannot be covered by a terrestrial 5G network mainly due to the cost aspect, by using a non-terrestrial device such as a satellite. Further, services with higher reliability may be provided by NTN. For example, NTN may be assumed to be applied to IoT (Inter of things), ships, buses, trains, and critical communications. Further, NTN has scalability according to efficient multi-cast or broadcast.

As an example of NTN, as illustrated in FIG. 1, a satellite 10A can provide services to an area such as a mountainous area for which a terrestrial base station is not arranged, by performing retransmission of a signal transmitted by a terrestrial base station 10B.

Note that the terrestrial 5G network may have a structure as described below. The terrestrial 5G network may include one or more base stations 10 and terminals 20. The base station 10 is a communication device that provides one or more cells and performs wireless communication with the terminal 20. Physical resources of the radio signal may be defined in the time domain and the frequency domain, the time domain may be defined by the number of OFDM symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information.

The base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, both the base station 10 and terminal 20 may perform communications via an SCell (Secondary Cell) and a PCell (Primary Cell) using CA (Carrier Aggregation).

The terminal 20 may be a communication apparatus that includes a wireless communication function such as a smartphone, a mobile phone, a tablet, a wearable terminal, a communication module for M2M (Machine-to-Machine), or the like. The terminal 20 uses various communication services provided by a wireless communication system, by receiving a control signal or data in DL from the base station 10 and transmitting a control signal or data in UL to the base station 10.

Figure 2:
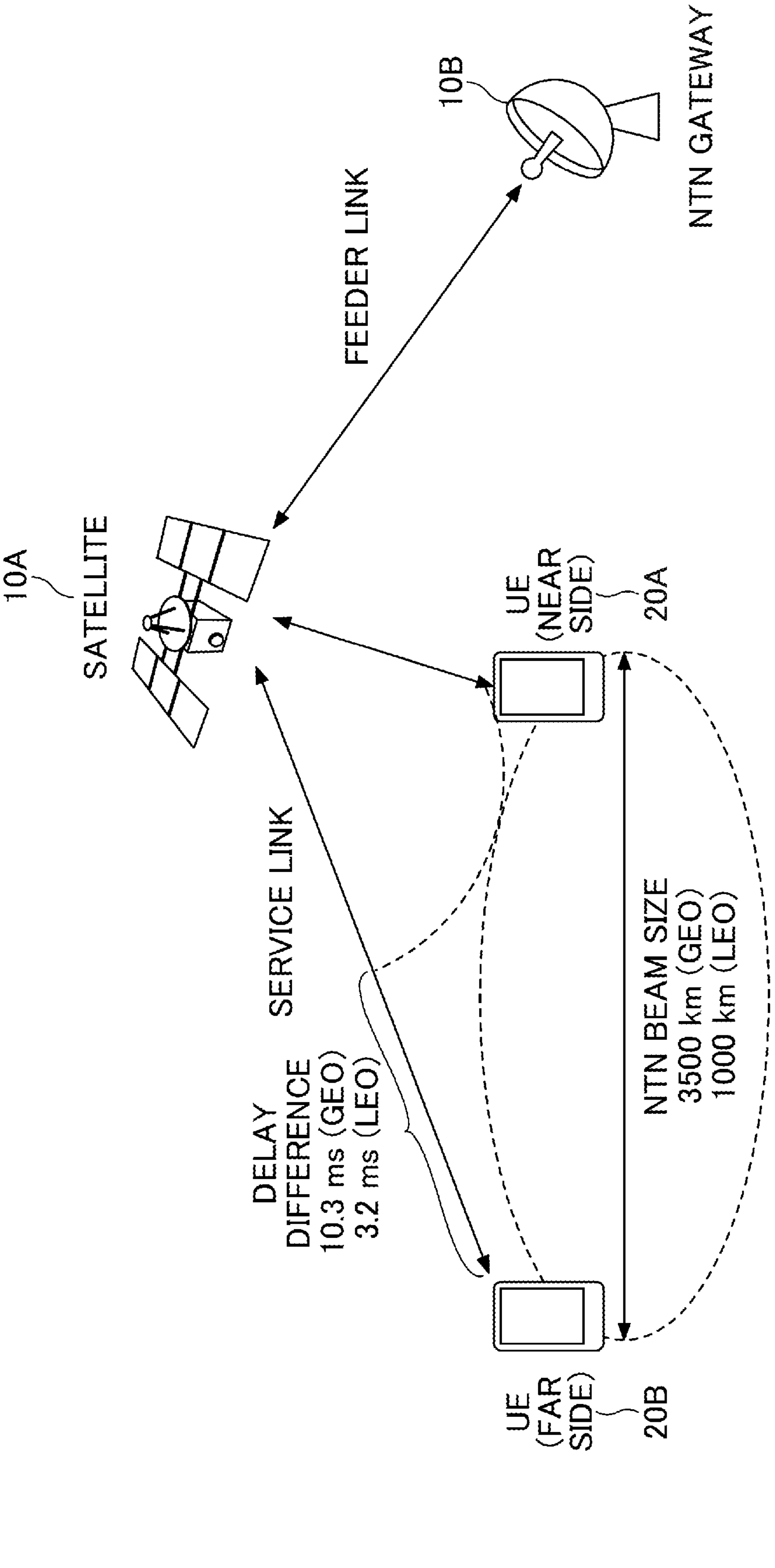
FIG. 2 is a drawing illustrating an example (2) of NTN.

FIG. 2 is a drawing illustrating an example (2) of NTN. In NTN, a cell or an area for each beam is very large when compared with a terrestrial network, TN. FIG. 2 illustrates an example of NTN including retransmissions by a satellite. The connection between a satellite 10A and an NTN gateway 10B is referred to as a feeder link, and the connection between the satellite 10A and a UE 20 is referred to as a service link.

As illustrated in FIG. 2, the delay difference between the near side UE 20A and the far side UE 20B is, for example, 10.3 ms in a case of GEO (Geosynchronous orbit), and 3.2 ms in a case of LEO (Low Earth orbit). Further, the beam size in NTN is, for example, 3500 km in a case of GEO, and 1000 km in a case of LEO.

Figure 3:
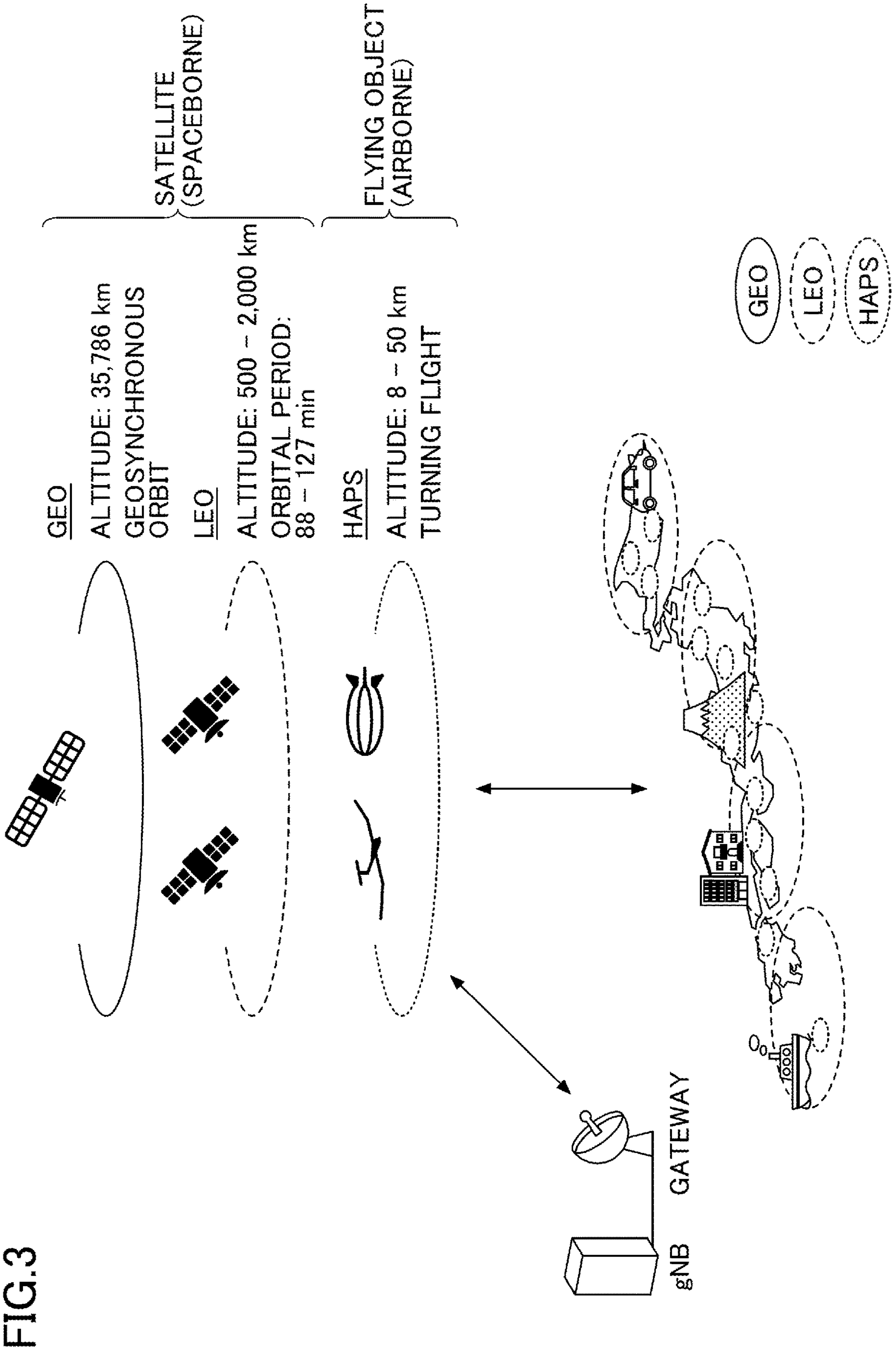
FIG. 3 is a drawing illustrating an example (3) of NTN.

FIG. 3 is a drawing illustrating an example (3) of NTN. As illustrated in FIG. 3, NTN is implemented by a satellite in space or a flying object in the air. For example, the GEO satellite may be a satellite located at altitude 35,786 km, with a geosynchronous orbit. For example, the LEO satellite may be a satellite located at altitude 500 to 2000 km, with a turning flight of a period of 88 to 127 minutes. For example, HAPS (High Altitude Platform Station) may be a flying object located at altitude 8 to 50 km, with a turning flight.

As illustrated in FIG. 3, the GEO satellite, the LEO satellite and the HAPS flying object may be connected to a terrestrial station gNB via a gateway. In addition, the service area increases in the order of HAPS, LEO, and GEO.

For example, the coverage of the 5G network can be enhanced by NTN, with respect to the area with no service and the area with services. In addition, for example, the continuity, availability, and reliability of services in the ship, bus, train or other important communications can be improved by NTN. Note that NTN may be indicated by transmitting a dedicated parameter to the terminal 20, and the dedicated parameter may be, for example, a parameter related to TA (Timing Advance) determination based on the information related to the satellite or the flying object.

Figure 4:
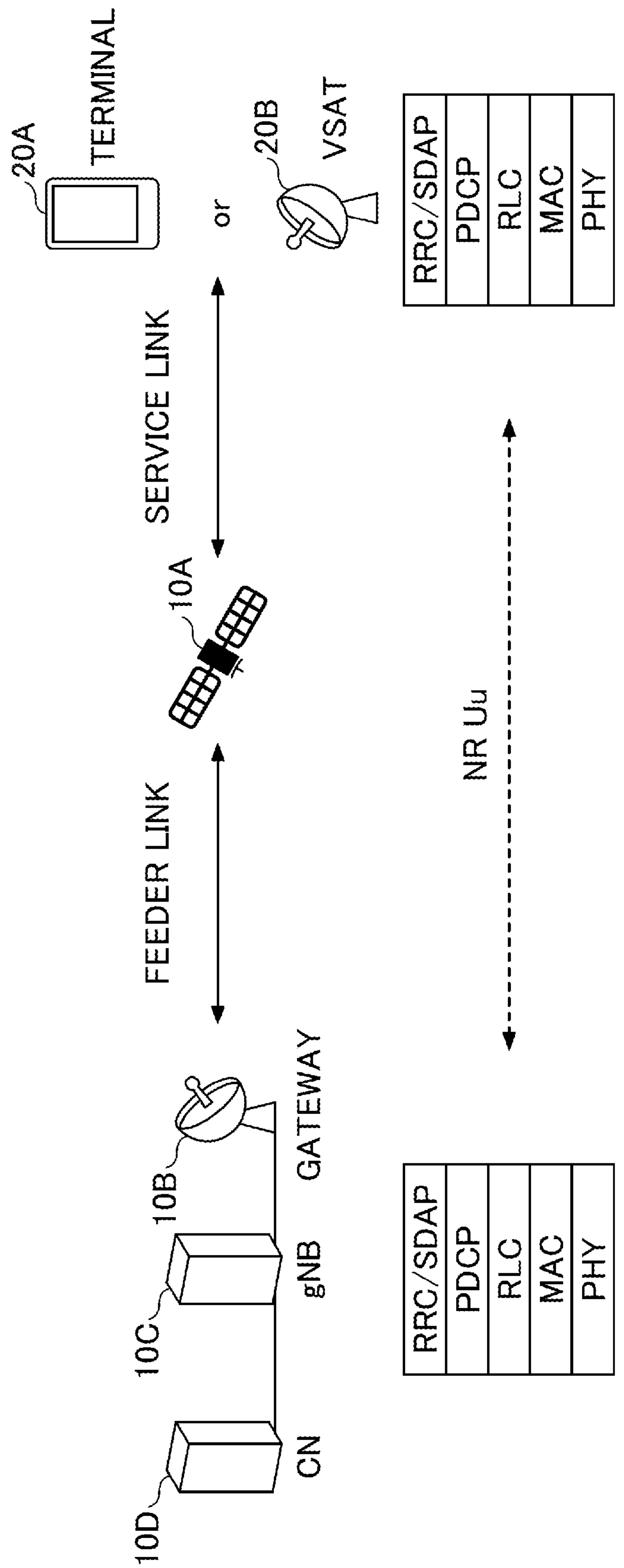
FIG. 4 is a drawing illustrating an example (4) of NTN.

FIG. 4 is a drawing illustrating an example (4) of NTN. FIG. 4 illustrates an example of an NTN network architecture that is assumed in a case of transparent payload. As illustrated in FIG. 4, a CN (Core Network) 10D, a gNB 10C and a gateway 10B are connected. The gateway 10B is connected to a satellite 10A via a feeder link. The satellite 10A is connected to a terminal 20A or a VSAT (Very small aperture terminal) 20B via a service link. NR Uu is established between the gNB 10C and the terminal 20A or VSAT 20B.

In addition, as an assumption of the NTN network architecture, FDD may be adopted, or TDD may be available. In addition, the terrestrial cell may be fixed or movable. In addition, the terminal 20 may have GNSS (Global Navigation Satellite System) capability. For example, in FR1, a hand-held device with power class 3 may be assumed. In addition, a VSAT device may be assumed at least in FR2.

In addition, a regenerative payload may be assumed in the NTN network architecture. For example, a gNB function may be installed in the satellite or the flying object. In addition, a gNB-DU may be installed in the satellite or the flying object, and a gNB-CU may be arranged as a terrestrial station.

In NTN, it is necessary to consider the long propagation delay, LEO or HAPS movement, and communications via GEO, LEO or HAPS. Because of these characteristics of NTN, enhancement of HARQ operation is being discussed. For example, the HARQ feedback may be disabled. In a case where the HARQ feedback is disabled, it is possible to transmit two consecutive DL transport blocks in a single HARQ process without waiting for the feedback.

Figure 5:
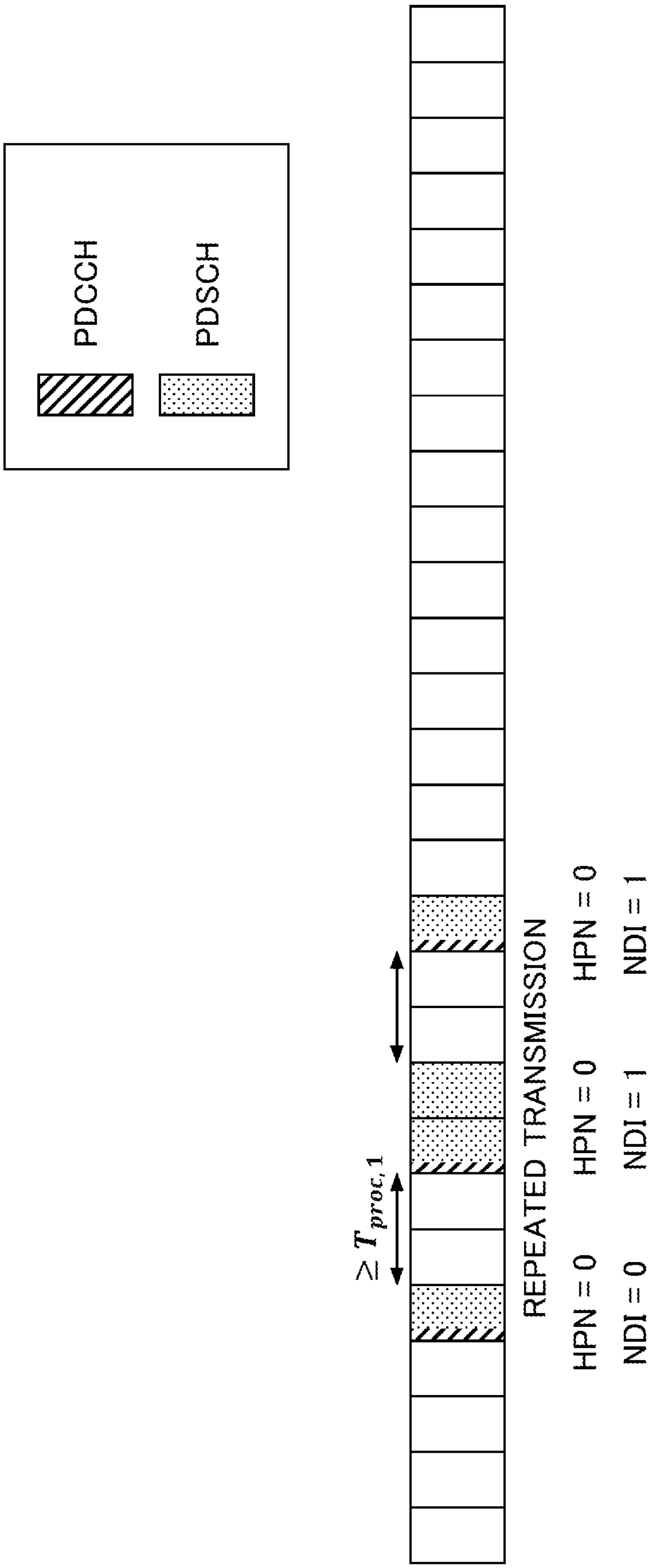
FIG. 5 is a drawing illustrating an example (1) of HARQ feedback.

FIG. 5 is a drawing illustrating an example (1) of HARQ feedback. By using FIG. 5, an example of a case will be described in which HARQ feedback is disabled. As illustrated in FIG. 5, after receiving PDCCH and PDSCH, the terminal 20 receives PDCCH and PDSCH without transmitting HARQ feedback. The time from a time point of completion of PDSCH reception to a time point of the start of PDCCH reception is required to be longer than, for example, the processing time $T_{proc,1}$ shown in Non-Patent Document 4. In FIG. 5, a transport block, which is different from a transport block that is transmitted by the first PDSCH, is transmitted by the second PDSCH. An example is illustrated in which repeated transmission is applied to the second PDSCH, and an NDI is not toggled in the third PDSCH corresponding to retransmission of the second PDSCH.

Figure 6:
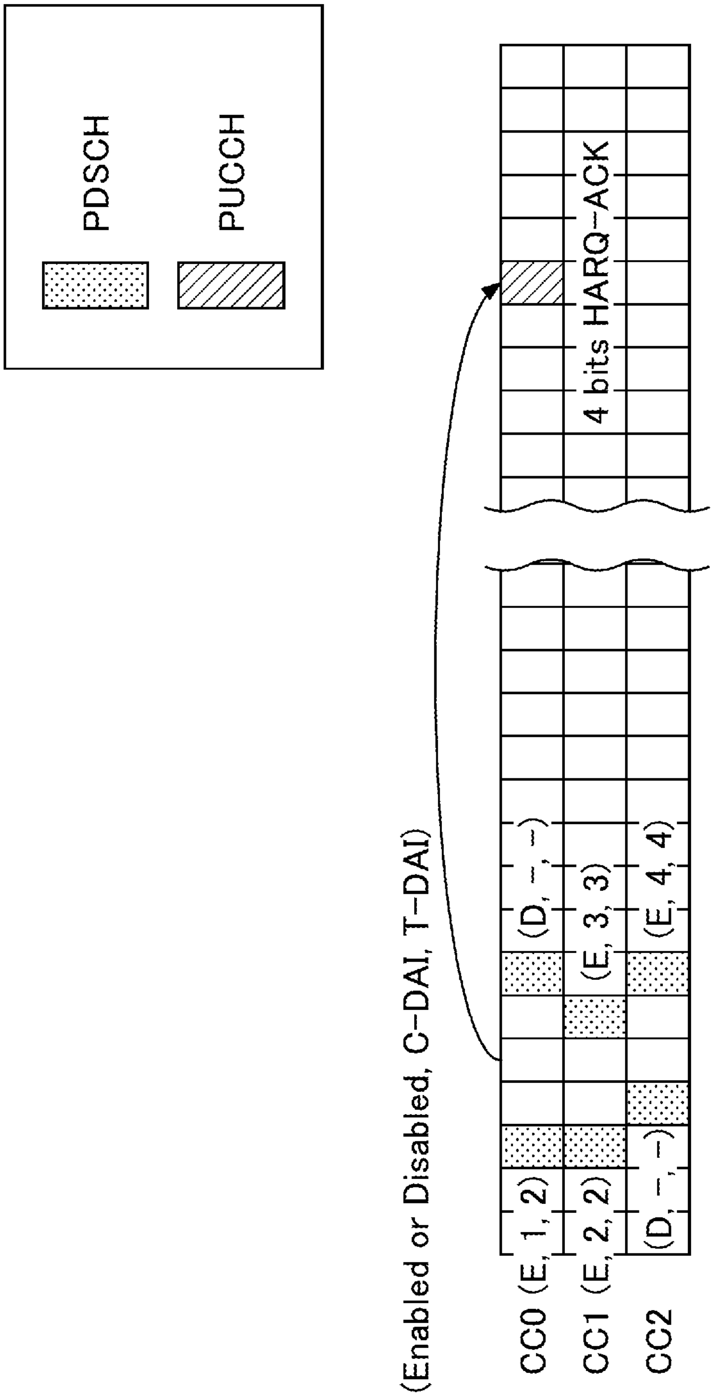
FIG. 6 is a drawing illustrating an example (2) of HARQ feedback.

FIG. 6 is a drawing illustrating an example (2) of HARQ feedback. By using FIG. 6, a configuration method of HARQ-ACK codebook type 2 in a case where HARQ feedback is disabled, will be described. As illustrated in FIG. 6, HARQ-ACK bits, which correspond only to PDSCHs for which HARQ feedback is enabled, are generated, and HARQ-ACK bits, which correspond to a case in which HARQ feedback is disabled, are not generated. In addition, DAI (Downlink assignment indicator) is counted only based on DCI transmitted by PDCCH corresponding to PDSCH for which HARQ feedback is enabled.

Here, in SPS (Semi-persistent scheduling), a mechanism of disabling the HARQ feedback has been unclear. For example, it is necessary to clarify: whether disabling the HARQ feedback is to be applied to SPS; how to perform enabling or disabling and to perform feedback; whether constraints according to processing time is to be applied; etc.

Thus, in NTN, the terminal 20 may perform a specific operation related to SPS and HARQ feedback.

For example, in SPS in NTN, the HARQ feedback may be always enabled. According to the above, a simple rule can be applied to the HARQ feedback.

Figure 7:
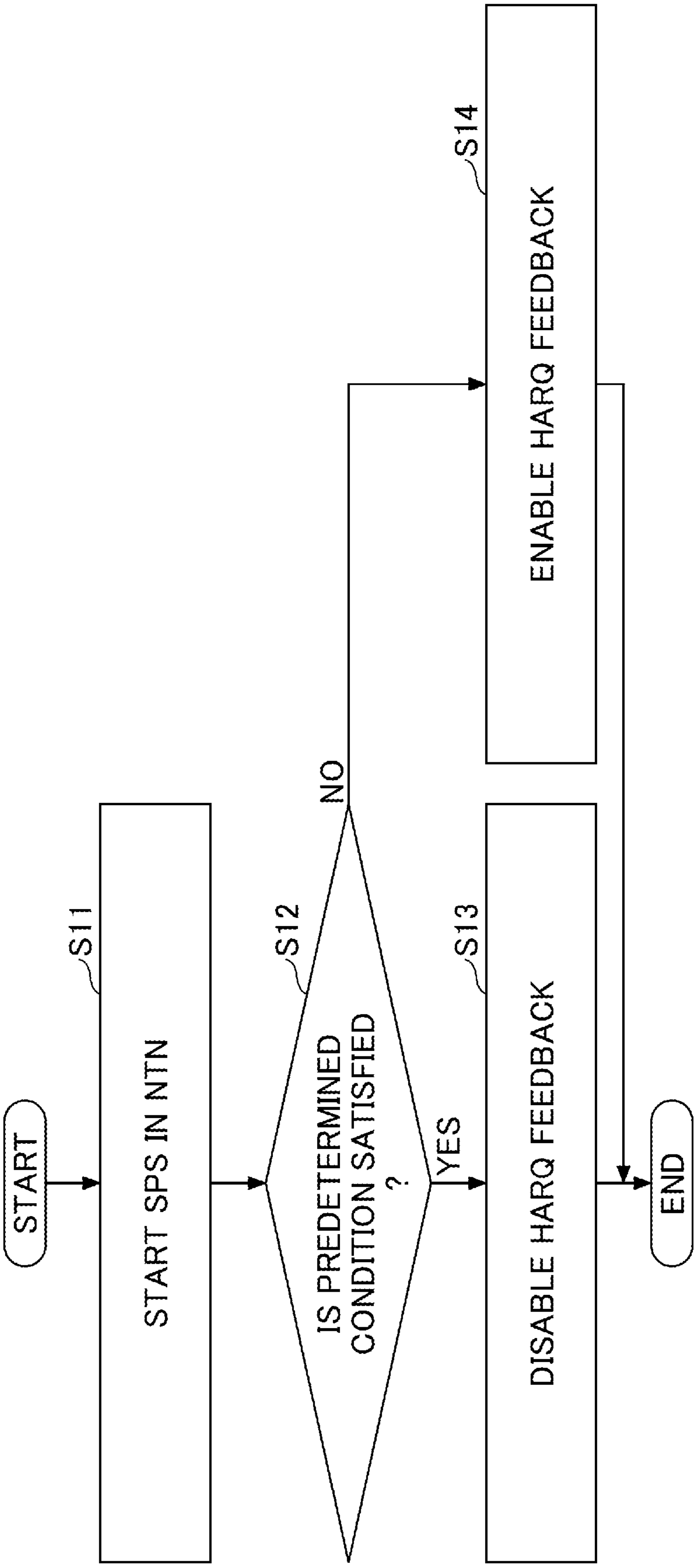
FIG. 7 is an example of a HARQ feedback in an embodiment of the present invention.

In addition, for example, in SPS in NTN, the HARQ feedback may be enabled to be disabled. According to the above, an issue of large latency can be solved also in SPS. FIG. 7 is an example of a HARQ feedback in an embodiment of the present invention. In step S11, the terminal 20 starts communications in NTN in which SPS is applied. In subsequent step S12, the terminal 20 determines whether a predetermined condition is satisfied. In a case where the predetermined condition is satisfied (YES in S12), the terminal 20 disables the HARQ feedback (S13). On the other hand, in a case where the predetermined condition is not satisfied (NO in S12), the terminal 20 enables the HARQ feedback (S14).

For example, the predetermined condition in the above-described step S12 may be determined as described in 1) to 4) below.

1) The predetermined condition may mean that the disabled feedback is configured to the HARQ process ID of the SPS. For example, with respect to HARQ process IDs for SPS, in a case where the feedback is enabled for some HARQ process IDs, and the feedback is disabled for the remaining HARQ process IDs, the enabled feedback may be applied or the disabled feedback may be applied, or the terminal 20 may apply the enabled feedback or the disabled feedback based on the configuration of the predetermined HARQ process ID (for example, the configuration of the HARQ process ID=0).

2) The predetermined condition may mean that an individual (dedicated) parameter is configured for the SPS. For example, the name of the individual parameter may be SPS-feedbackDisabled. The individual parameter may be configured for each SPS configuration, for each SPS-PDSCH occasion, for each CC, or for each UE. In a case of the configuration for each UE, the individual parameter may be configured in common for a plurality of CCs.

3) The predetermined condition may mean that disabling of the HARQ feedback related to the SPS is activated by MAC-CE (Medium Access Control—Control Element). In addition, the predetermined condition may mean that the disabling of the HARQ feedback related to the SPS is activated or indicated via DCI. The individual parameter may be activated or indicated for each SPS configuration, for each SPS-PDSCH occasion, for each CC, for each UE, or for each HARQ process related to the SPS. In a case of the activation or indication for each UE, the individual parameter may be activated or indicated in common for a plurality of CCs.

4) The predetermined condition may mean that the enabling or disabling of the HARQ feedback is indicated at the time when the SPS is activated.

Note that whether the HARQ feedback of PDSCH (that is, PDSCH scheduled by DCI with CRC scrambled by CS-RNTI) that is dynamically allocated for retransmission of an SPS-SDSCH (that is, transport block transmitted by SPS PDSCH) is enabled or disabled may be determined according to the configuration/activation/indication of enabling or disabling of the HARQ feedback of the SPS-PDSCH.

In addition, in a case where the HARQ feedback for a HARQ process ID is configured to be disabled, the disabled HARQ feedback may be applied to both the dynamically allocated PDSCH and the SPS-PDSCH. In addition, for example, in a case where enabling/disabling of the HARQ feedback for the HARQ feedback for the SPS is configured, the disabled HARQ feedback configured for the HARQ process ID may be applied only to the dynamically allocated PDSCH.

In addition, in a case where the HARQ feedback is configured to be disabled for a HARQ process ID, the HARQ process ID may be enabled to be used for both the dynamically allocated PDSCH and the SPS-PDSCH.

Alternatively, in a case where the HARQ feedback for a HARQ process ID is configured to be disabled, the HARQ process ID may be enabled to be used for both the dynamically allocated PDSCH and the SPS-PDSCH if the parameter of the above-described 1) is configured for SPS. If the parameter of the above-described 1) is not configured, the HARQ process ID may be enabled to be used only for the dynamically allocated PDSCH.

In addition, in a case where a HARQ process ID is enabled to be used for the SPS-PDSCH, the terminal 20 is not required to receive the SPS-PDSCH to perform the HARQ feedback using the HARQ process ID or may skip the reception of the SPS-PDSCH using the HARQ process ID.

Note that the HARQ process ID for SPS may be determined as described below.

$$HARQ\ \text{Process}\ ID = [\text{floor}(\text{Current\_slot} * 10/(numberOfSlotsPerFrame * \text{periodicity}))]\ \text{modulo}\ nrofHARQ\text{-Processes, or}$$

$$HARQ\ \text{Process}\ ID = [\text{floor}(\text{Current\_slot} * 10/(numberOfSlotsPerFrame * \text{periodicity}))]\ \text{modulo}\ nrofHARQ\text{-Processes} + harq\text{-}ProcID\text{-Offset.}$$

Here, CURRENT_slot=[(SFN×numberOfSlotsPerFrame)+slot number in the frame], and numberOfSlotsPerFrame is a number of consecutive slots per frame. In addition, nrof-HARQ-Processes is a number of HARQ processes used for SPS.

In addition, in NTN, the terminal 20 may perform a predetermined operation related to SPS activation/release and HARQ feedback as described in 1) to 4) below.

1) The terminal 20 may assume that an indication of activating or releasing SPS may be received via a HARQ process in which the HARQ process feedback is enabled. For example, in a case where the special field indicating SPS activation or release is not enhanced as described in 3) below, the feedback with HPN=0 may be configured to be enabled.

2) The HARQ feedback of an indication of SPS activation or release may be always transmitted regardless of the configuration of disabling the feedback.

3) In an indication of SPS activation or release in NTN, the HARQ process number field may be assumed to be not included in the DCI special field. In other words, in an active DL/UL-BWP of the scheduled cell, the special field in TN when the terminal 20 receives a plurality of DL-SPS configurations may be assumed to be used regardless of the configured number of SPSs in NTN.

Table 1 illustrates an example of a special field indicating a single SPS activation.

TABLE 1

| | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For the enabled transport block: set to all '0's |

As shown in Table 1, all '0's are set in the HARQ process number and the redundancy version.

Table 2 illustrates an example of a special field indicating a single SPS release.

TABLE 2

| | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with μ = 1<br>set to all '1's, otherwise | set to all '0's for FDRA Type 0 or for dynamicSwitch<br>set to all '1's for FDRA Type 1 |

As shown in Table 2, all '0's are set in the HARQ process number and the redundancy version. In addition, all '1's are set in MCS. All '0's or all '1's are set in the frequency domain resource assignment.

Table 3 illustrates an example of a special field indicating a single SPS activation in a case where a plurality of SPSs are configured.

TABLE 3

| | DCI format 0_0/0_1/0_2 | DCI format 1_0/1_2 | DCI format 1_1 |
|---|---|---|---|
| Redundancy version | set to all '0's | set to all '0's | For the enabled transport block: set to all '0's |

As shown in Table 3, all '0's are set in the redundancy version.

Table 4 illustrates an example of a special field indicating a single SPS release in a case where a plurality of SPSs are configured.

TABLE 4

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with μ =1<br>set to all '1's, otherwise | set to all '0's for FDRA Type 0 or for dynamicSwitch<br>set to all '1's for FDRA Type 1 |

As shown in Table 4, all '0's are set in the redundancy version. In addition, all '1's are set in MCS. All '0's or all '1's are set in the frequency domain resource assignment depending on a condition.

4) The terminal 20 may follow the activation or disabling of the HARQ feedback of the HARQ process that is indicated by DCI for activating or releasing SPS.

By performing an operation as described above, it is possible to clarify an operation of the terminal 20 related to the SPS activation/release and the HARQ feedback. In the above-described 1) and the above-described 2), the reliability is improved by enabling the HARQ feedback for an indication indicating the SPS activation/release to be ensured to be performed. In addition, in the above-described 4), flexibility is improved.

In addition, in NTN, the terminal 20 may assume an operation related to processing time related to SPS-PDSCH reception to be as described in 1) to 4) below.

1) With respect to a DL-HARQ process in which the HARQ feedback is configured to be disabled, the terminal 20 is not required to assume reception of an SPS-PDSCH in the DL-HARQ process in a period until X elapses from an end of a last PDSCH reception. For example, the last PDSCH may be a PDSCH according to a dynamic grant or may be an SPS-PDSCH. For example, the processing time X may be $T_{proc,1}$ as described above.

2) The number of HARQ processes (nrofHARQ-Processes) and the periodicity (periodicity) that do not satisfy the processing time X are not assumed to be configured.

3) The SPS-PDSCH reception that does not satisfy the processing time X may be skipped.

4) In a case where there is a DL-HARQ process for which the HARQ feedback is configured to be disabled and two SPS-PDSCHs are received, the following assumption is not required to be applied. With respect to a DL-HARQ process in which the HARQ feedback is configured to be disabled according to a dynamic grant, the terminal 20 is not required to assume reception of a PDCCH carrying DCI that schedules another PDSCH in the DL-HARQ process in a period until the processing time X elapses from an end of a last PDSCH reception.

By performing the above-described assumption, an assumption of processing time related to the SPS-PDSCH reception can be clarified. In addition, the UE processing time is ensured and the UE cost can be reduced. In addition, the scheduling flexibility can be improved.

Note that the HARQ process ID may be replaced with the HARQ process or the HARQ process number. Note that the SPS may be replaced with Configured grant (CG) type 2. The SPS activation/release may be replaced with CG type 2 activation/release. Note that the SPS-PDSCH may be replaced with PDSCH without corresponding PDCCH. Note that the PDSCH may be replaced with a slot-aggregated PDSCH.

Note that the deactivation may be replaced with release. Note that the dynamically allocated PDSCH may be associated with C-RNTI or MCS-C-RNTI. Note that the SPS-PDSCH may be associated with CS-RNTI. In addition, UE capability indicating whether each of the above-described functions is to be supported may be defined and may be transmitted from the terminal 20.

According to the above-described embodiment, the terminal 20 can configure disabling of the HARQ feedback when activating the SPS in an NTN environment.

That is, the HARQ (Hybrid automatic repeat request) feedback can be disabled in a wireless communication system.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 8:
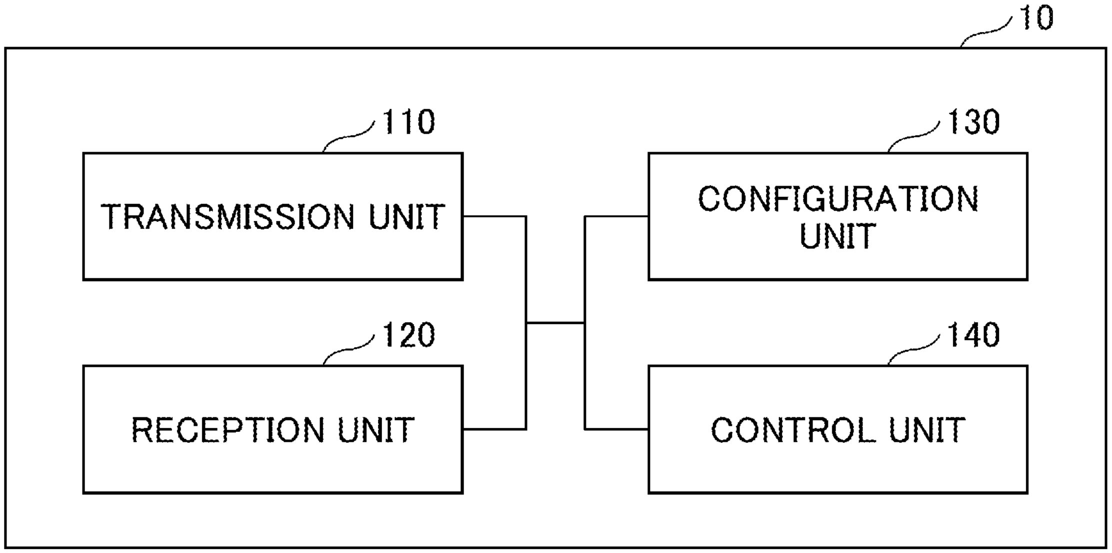
FIG. 8 is a drawing illustrating an example of a functional structure of a base station 10 in an embodiment of the present invention.

FIG. 8 is a drawing illustrating an example of a functional structure of a base station 10 according to an embodiment of the present invention. As shown in FIG. 8, the base station 10 includes a transmission unit 110, a reception unit 120, a configuration unit 130, and a control unit 140. The functional structure illustrated in FIG. 8 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to communications in NTN.

The control unit 140 performs control related to communications in NTN as described in the embodiments. Further, the control unit 140 controls communications with the terminal 20 based on the radio-parameter-related UE capability report that is received from the terminal 20. The functional units related to signal transmission in the control unit 140 may be included in the transmission unit 110, and the functional units related to signal reception in the control unit 140 may be included in the reception unit 120.

<Terminal 20>

Figure 9:
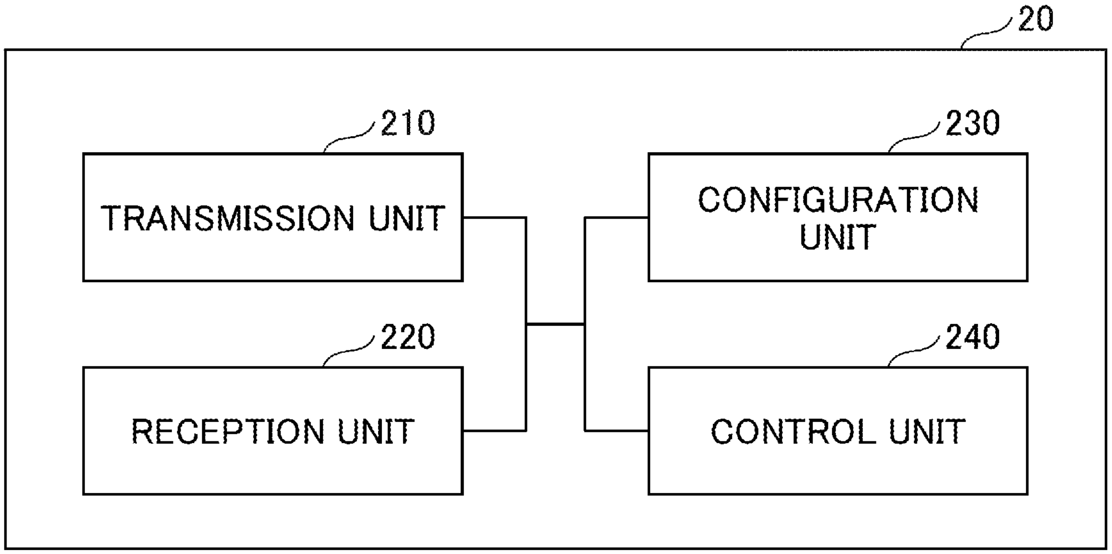
FIG. 9 is a drawing illustrating an example of a functional structure of a terminal 20 in an embodiment of the present invention.

FIG. 9 is a drawing illustrating an example of a functional structure of a terminal 20 according to an embodiment of the present invention. As shown in FIG. 9, the terminal 20 includes a transmission unit 210, a reception unit 220, a configuration unit 230, and a control unit 240. The functional structure illustrated in FIG. 9 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 120 receives, from the another terminal 20, PSCCH, PSSCH, PSDCH, or PSBCH.

The configuration unit 230 stores various configuration information items received by the reception unit 220 from the base station 10. In addition, the configuration unit 230 also stores pre-configured configuration information. Contents of the configuration information are, for example, information related to communications in NTN.

The control unit 240 performs control related to communications in NTN as described in the embodiments. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 10:
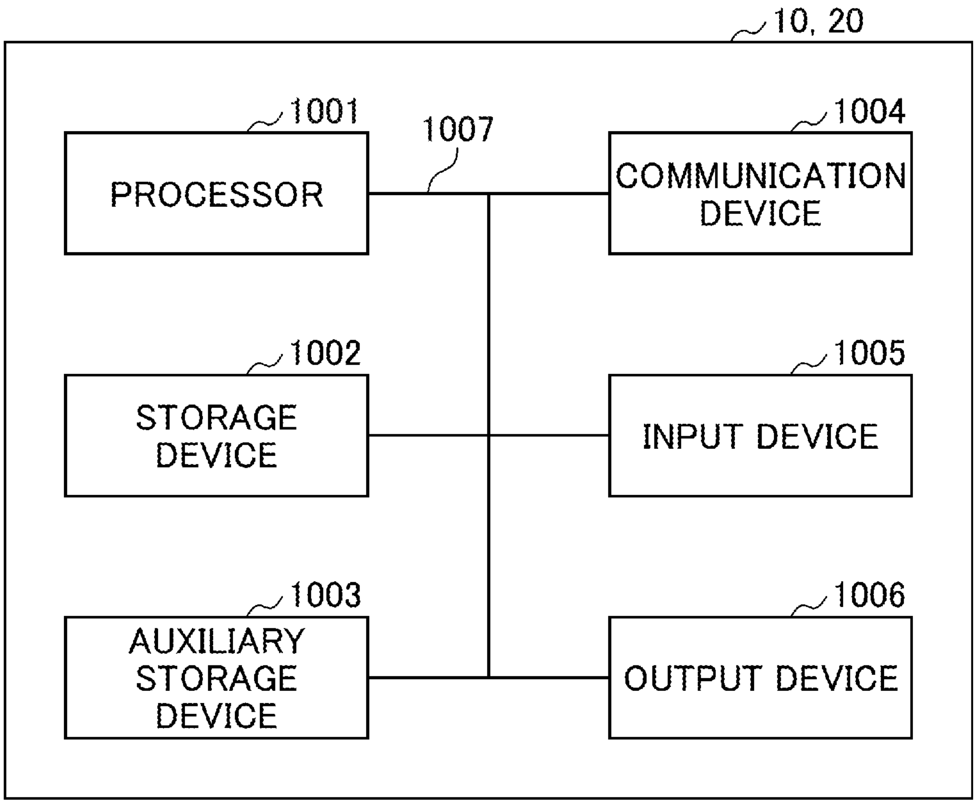
FIG. 10 is a drawing illustrating an example of a hardware structure of the base station 10 or the terminal 20 according to an embodiment of the present invention.

For example, the base station 10, terminal 20, etc., according to an embodiment of the present disclosure may function as a computer for processing the radio communication method of the present disclosure. FIG. 10 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 8 may be realized by control programs that are stored in the storage device 1002 and are executed by the processor 1001. Further, for example, the control unit 240 of the terminal 20 illustrated in FIG. 9 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive, from a base station, an indication for activating SPS (Semi-persistent scheduling)-PDSCH (Physical Downlink Shared Channel) in an NTN (Non-Terrestrial Network) environment; a control unit configured to determine whether a HARQ (Hybrid automatic repeat request) feedback corresponding to the SPS-PDSCH is enabled or disabled; and a transmission unit configured to transmit the HARQ feedback to the base station in a case where the HARQ feedback is enabled.

According to the above configuration, the terminal 20 can configure disabling of the HARQ feedback when activating the SPS in an NTN environment according to the necessity. That is, the HARQ (Hybrid automatic repeat request) feedback can be disabled in a wireless communication system.

The control unit may determine whether the HARQ feedback is enabled or disabled based on a HARQ process number. According to the above configuration, the terminal 20 can configure disabling of the HARQ feedback when activating the SPS in an NTN environment according to the necessity.

The control unit may determine whether the HARQ feedback is enabled or disabled in a case in which retransmission of the SPS-PDSCH is performed via a dynamically allocated PDSCH, based on whether a HARQ feedback corresponding to the SPS-PDSCH is enabled or disabled. According to the above configuration, the terminal 20 can configure disabling of the HARQ feedback when activating the SPS in an NTN environment according to the necessity.

The control unit may assume that an indication for activating or releasing the SPS-PDSCH is received via a HARQ process in which the HARQ feedback is enabled. According to the above configuration, the terminal 20 can configure disabling of the HARQ feedback when activating the SPS in an NTN environment according to the necessity.

With respect to a HARQ process in which the HARQ feedback is configured to be disabled, the reception unit is not required to assume that a SPS-PDSCH is received in the HARQ process in a period until a process time elapses from an end of a last PDSCH reception. According to the above configuration, the terminal 20 can assume processing time at the time of disabling the HARQ feedback when activating the SPS in an NTN environment.

In addition, according to an embodiment of the present invention, a communication method performed by a terminal is provided. The communication method includes: receiving, from a base station, an indication for activating SPS (Semi-persistent scheduling)-PDSCH (Physical Downlink Shared Channel) in an NTN (Non-Terrestrial Network) environment; determining whether a HARQ (Hybrid automatic repeat request) feedback corresponding to the SPS-PDSCH is enabled or disabled; and transmitting the HARQ feedback to the base station in a case where the HARQ feedback is enabled.

According to the above configuration, the terminal 20 can configure disabling of the HARQ feedback when activating the SPS in an NTN environment according to the necessity. That is, the HARQ (Hybrid automatic repeat request) feedback can be disabled in a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a receiver configured to receive, from a base station, an indication for activating SPS (Semi-persistent scheduling)-PDSCH (Physical Downlink Shared Channel);

a processor configured to determine whether HARQ (Hybrid automatic repeat request) feedback corresponding to the SPS-PDSCH is enabled or disabled for each HARQ process; and a transmitter configured to transmit HARQ feedback to the base station in a case where HARQ feedback is enabled, wherein the processor does not assume that an SPS-PDSCH is to be received in a HARQ process until a time point at which a processing time elapses from a time point of an end of a last PDSCH reception in the HARQ process in which HARQ feedback is disabled, wherein the processor applies disabled HARQ feedback to both a dynamically allocated PDSCH and the SPS-PDSCH in a HARQ process in which HARQ feedback is disabled, and wherein the transmitter transmits HARQ feedback after activation of SPS-PDSCH to the base station regardless of a configuration of disabling HARQ feedback.

2. A base station comprising:

a transmitter configured to transmit, to a terminal, an indication for activating SPS (Semi-persistent scheduling)-PDSCH (Physical Downlink Shared Channel);

a processor configured to configure whether HARQ (Hybrid automatic repeat request) feedback corresponding to the SPS-PDSCH is enabled or disabled for each HARQ process; and a receiver configured to receive HARQ feedback from the terminal in a case where HARQ feedback is enabled, wherein the processor does not transmit an SPS-PDSCH in a HARQ process until a time point at which a processing time elapses from a time point of an end of a last PDSCH reception in the HARQ process in which HARQ feedback is disabled, wherein the processor applies disabled HARQ feedback to both a dynamically allocated PDSCH and the SPS-PDSCH in a HARQ process in which HARQ feedback is disabled, and wherein the receiver receives HARQ feedback after activation of SPS-PDSCH to the base station regardless of a configuration of disabling HARQ feedback.

3. A communication system comprising: a terminal; and a base station, wherein the terminal includes:

a receiver configured to receive, from a base station, an indication for activating SPS (Semi-persistent scheduling)-PDSCH (Physical Downlink Shared Channel);

a processor configured to determine whether HARQ (Hybrid automatic repeat request) feedback corresponding to the SPS-PDSCH is enabled or disabled for each HARQ process;

a transmitter configured to transmit HARQ feedback to the base station in a case where HARQ feedback is enabled, wherein the processor does not assume that an SPS-PDSCH is to be received in a HARQ process until a time point at which a processing time elapses from a time point of an end of a last PDSCH reception in the HARQ process in which HARQ feedback is disabled, wherein the processor applies disabled HARQ feedback to both a dynamically allocated PDSCH and the SPS-PDSCH in a HARQ process in which HARQ feedback is disabled, and wherein the transmitter transmits HARQ feedback after activation of SPS-PDSCH to the base station regardless of a configuration of disabling HARQ feedback, and the base station includes:

a transmitter configured to transmit, to the terminal, an indication for activating the SPS-PDSCH;

a processor configured to configure whether HARQ feedback corresponding to the SPS-PDSCH is enabled or disabled for each HARQ process; and a receiver configured to receive HARQ feedback from the terminal in a case where HARQ feedback is enabled, wherein the processor does not transmit an SPS-PDSCH in a HARQ process until a time point at which a processing time elapses from a time point of an end of a last PDSCH reception in the HARQ process in which HARQ feedback is disabled.

4. A communication method performed by a terminal, the communication method comprising:

receiving, from a base station, an indication for activating SPS (Semi-persistent scheduling)-PDSCH (Physical Downlink Shared Channel);

determining whether HARQ (Hybrid automatic repeat request) feedback corresponding to the SPS-PDSCH is enabled or disabled for each HARQ process;

transmitting HARQ feedback to the base station in a case where HARQ feedback is enabled;

not assuming that an SPS-PDSCH is to be received in a HARQ process until a time point at which a processing time elapses from a time point of an end of a last PDSCH reception in the HARQ process in which HARQ feedback is disabled;

applying disabled HARQ feedback to both a dynamically allocated PDSCH and the SPS-PDSCH in a HARQ process in which HARQ feedback is disabled, and transmitting HARQ feedback after activation of SPS-PDSCH to the base station regardless of a configuration of disabling HARQ feedback.

* * * * *